United States Patent
Elshafie et al.

(10) Patent No.: US 12,439,396 B2
(45) Date of Patent: Oct. 7, 2025

(54) TRANSMISSION ALIGNMENT FOR MINI-SLOTS AND MIXED NUMEROLOGY COMPONENT CARRIERS

(71) Applicant: QUALCOMM Incorporated, San Diego, CA (US)

(72) Inventors: Ahmed Elshafie, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 17/805,430

(22) Filed: Jun. 3, 2022

(65) Prior Publication Data

US 2023/0397185 A1 Dec. 7, 2023

(51) Int. Cl.
*H04W 72/12* (2023.01)
*H04L 1/08* (2006.01)
*H04L 5/00* (2006.01)

(52) U.S. Cl.
CPC .............. *H04W 72/12* (2013.01); *H04L 1/08* (2013.01); *H04L 5/001* (2013.01)

(58) Field of Classification Search
CPC ........... H04W 72/12; H04L 1/08; H04L 5/001
See application file for complete search history.

(56) References Cited

U.S. PATENT DOCUMENTS

| | | | |
|---|---|---|---|
| 11,871,418 B2 * | 1/2024 | Wang | H04W 72/20 |
| 2017/0353819 A1 * | 12/2017 | Yin | H04W 4/70 |
| 2018/0359749 A1 * | 12/2018 | Liu | H04W 72/02 |
| 2020/0178221 A1 * | 6/2020 | Byun | H04W 72/23 |
| 2020/0359375 A1 * | 11/2020 | Hwang | H04L 1/1854 |
| 2020/0374858 A1 * | 11/2020 | Vargas | H04W 72/20 |
| 2021/0314933 A1 * | 10/2021 | Zhang | H04W 72/20 |
| 2022/0150872 A1 * | 5/2022 | Park | H04W 92/18 |
| 2022/0361168 A1 | 11/2022 | Lim et al. | |
| 2022/0361182 A1 | 11/2022 | Medina et al. | |
| 2023/0028098 A1 | 1/2023 | Lin et al. | |
| 2024/0057133 A1 * | 2/2024 | Yoshioka | H04W 72/12 |
| 2024/0224255 A1 | 7/2024 | Elshafie | |

* cited by examiner

*Primary Examiner* — Justin T Van Roie
(74) *Attorney, Agent, or Firm* — Dinsmore & Shohl LLP

(57) ABSTRACT

Certain aspects of the present disclosure provide techniques for wireless communications by a user equipment (UE). In one aspect, a method includes determining that (1) a first scheduled sidelink transmission to a first receiving UE using a first set of component carriers and (2) a second scheduled sidelink transmission to a second receiving UE using a second set of component carriers will overlap in a time domain; determining that the first scheduled sidelink transmission has a first transmission time length and the second scheduled sidelink transmission has a second transmission time length, wherein the second transmission time length is shorter than the first transmission time length; segmenting the first scheduled sidelink transmission into a plurality of first sidelink transmission segments; and sending, to the first receiving UE, an indication of the plurality of first sidelink transmission segments.

20 Claims, 13 Drawing Sheets

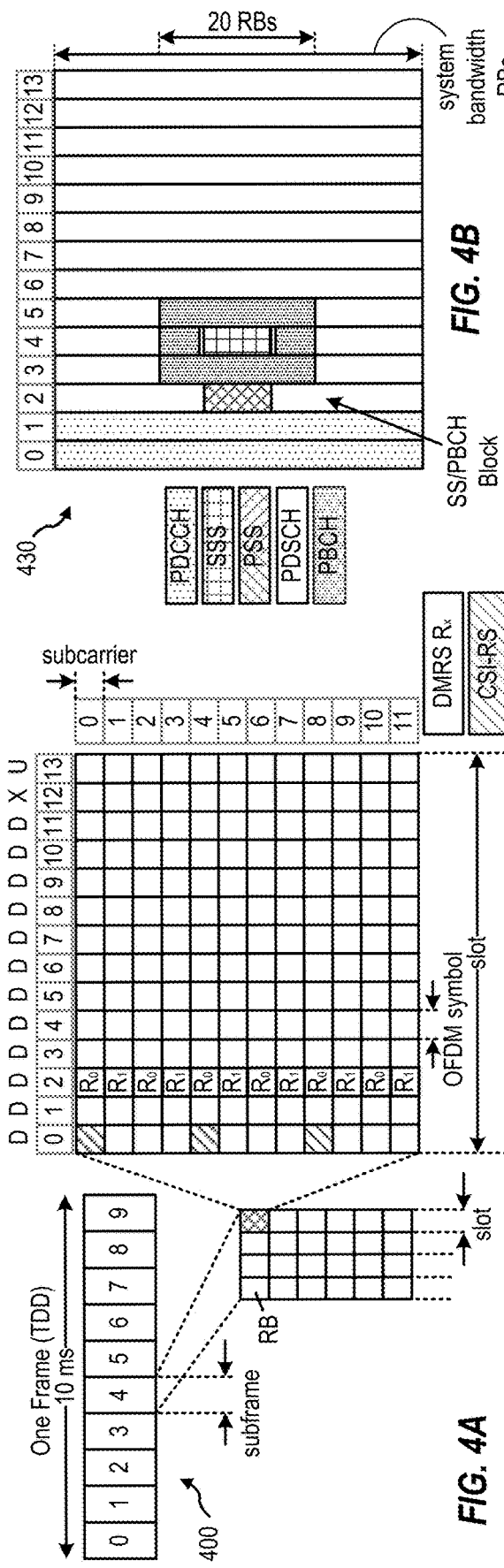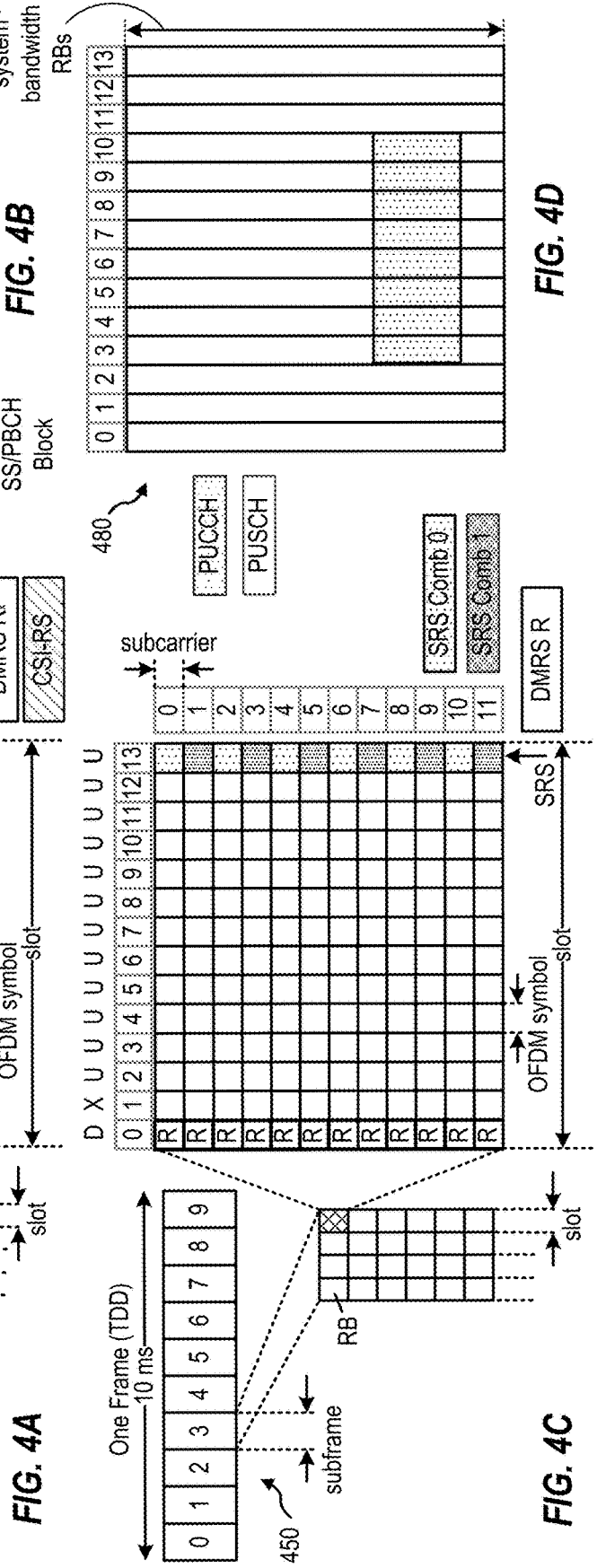
FIG. 4A
FIG. 4B
FIG. 4C
FIG. 4D

TRANSMISSION ALIGNMENT FOR MINI-SLOTS AND MIXED NUMEROLOGY COMPONENT CARRIERS

BACKGROUND

Field of the Disclosure

Aspects of the present disclosure relate to wireless communications, and more particularly, to techniques for transmission alignment for mini-slots and mixed numerology component carriers.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a user equipment (UE). The method includes determining that (1) a first scheduled sidelink transmission to a first receiving UE using a first set of component carriers and (2) a second scheduled sidelink transmission to a second receiving UE using a second set of component carriers will overlap in a time domain; determining that the first scheduled sidelink transmission has a first transmission time length and the second scheduled sidelink transmission has a second transmission time length, wherein the second transmission time length is shorter than the first transmission time length; segmenting the first scheduled sidelink transmission into a plurality of first sidelink transmission segments, wherein at least one first sidelink transmission segment of the plurality of first sidelink transmission segments overlaps in the time domain with the second scheduled sidelink transmission; and sending, to the first receiving UE, an indication of the plurality of first sidelink transmission segments.

Another aspect provides a method of wireless communications by a UE. The method includes determining that (1) a first scheduled sidelink transmission to a first receiving UE using a first set of component carriers and (2) a second scheduled sidelink transmission to a second receiving UE using a second set of component carriers will overlap in a time domain; determining that the first scheduled sidelink transmission has a first transmission time length and the second scheduled sidelink transmission has a second transmission time length, wherein the second transmission time length is shorter than the first transmission time length; and rescheduling the second scheduled sidelink transmission so that it does not overlap in the time domain with the first scheduled sidelink transmission.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
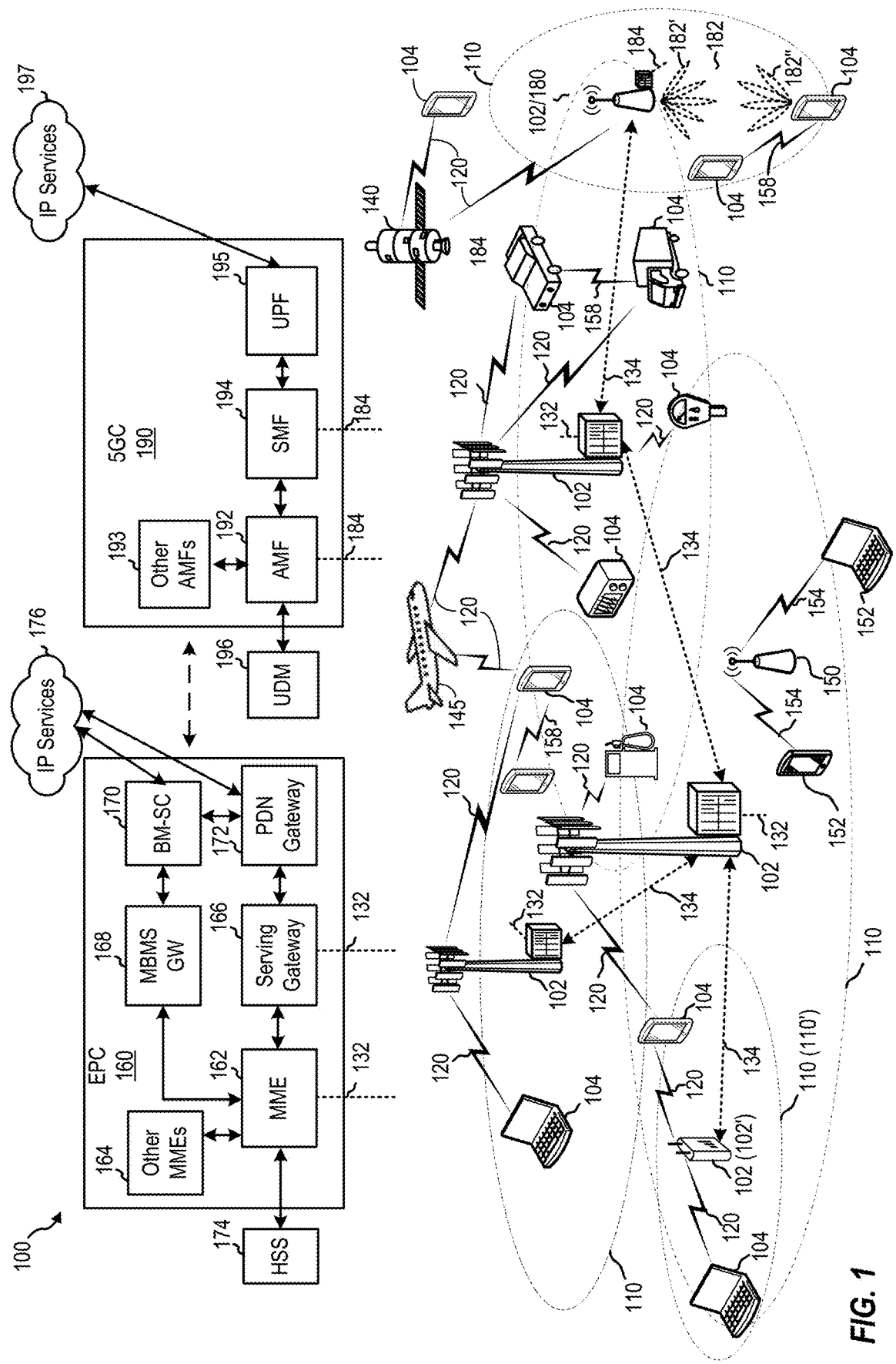
FIG. 1 depicts an example wireless communications network.

Aspects of the present disclosure provide apparatuses, methods, processing systems, and computer-readable mediums for transmission alignment for mini-slots and mixed numerology component carriers.

Carrier aggregation is a technique that is used in wireless communication to increase the data rate per user equipment (UE), whereby multiple frequency blocks (called component carriers) are assigned to the same UE. The different component carriers may be used to enhance the performance of a single application, or be used to support multiple concurrent applications on the UE. Generally, aggregating component carriers may beneficially enhance throughput and support more data-intensive applications in UEs.

Sidelink communications allow for device-to-device communication, in some cases without coordination by a network, which extends network coverage and capabilities.

Generally then, carrier aggregation and sidelink capabilities enhance a UE's ability to perform communications with many receiving devices at once. However, an issue arises when a UE is concurrently communicating with different devices (e.g., performing sidelink communications to multiple other UEs) over different and/or aggregated component carriers because the concurrent transmissions may not be aligned in time. Without time alignment, it is possible for the concurrent transmissions to lose coherency (e.g., by losing phase continuity between transmissions at a UE's power amplifier). Similarly, concurrent transmissions using different numerologies (e.g., different subcarrier spacings) can cause the same problems because symbol and thus slot times may not align with different numerologies being used concurrently. Conventional methods to avoid this problem have been to shorten a longer transmission to align the longer transmission's boundaries with the boundaries of a shorter, concurrent transmission. Shortening the longer transmission (e.g. by not using symbols within its transmission slot) means reducing data throughput and less efficient use of the transmission medium, which are extant technical problems with current wireless communications systems.

Aspects described herein relate to methods for segmenting (or dividing) a longer transmissions on a first component carrier so that the segments align in time with shorter transmissions (e.g., mini-slot transmissions) on a second component carrier. Notably, such methods are effective for transmissions that are different in time length while using the same or different numerologies (e.g., subcarrier spacings). The aspects described herein thus overcome the aforementioned technical problems in current wireless communications systems and allow for sidelink communications to use carrier aggregation while concurrently making use of sub-slot transmission types, such as mini-slot transmissions. In particular, aspects described herein enable aligned transmissions across intra-band component carriers, which maintains phase continuity and transmission coherency across component carriers and thereby improves wireless communications performance and reliability.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
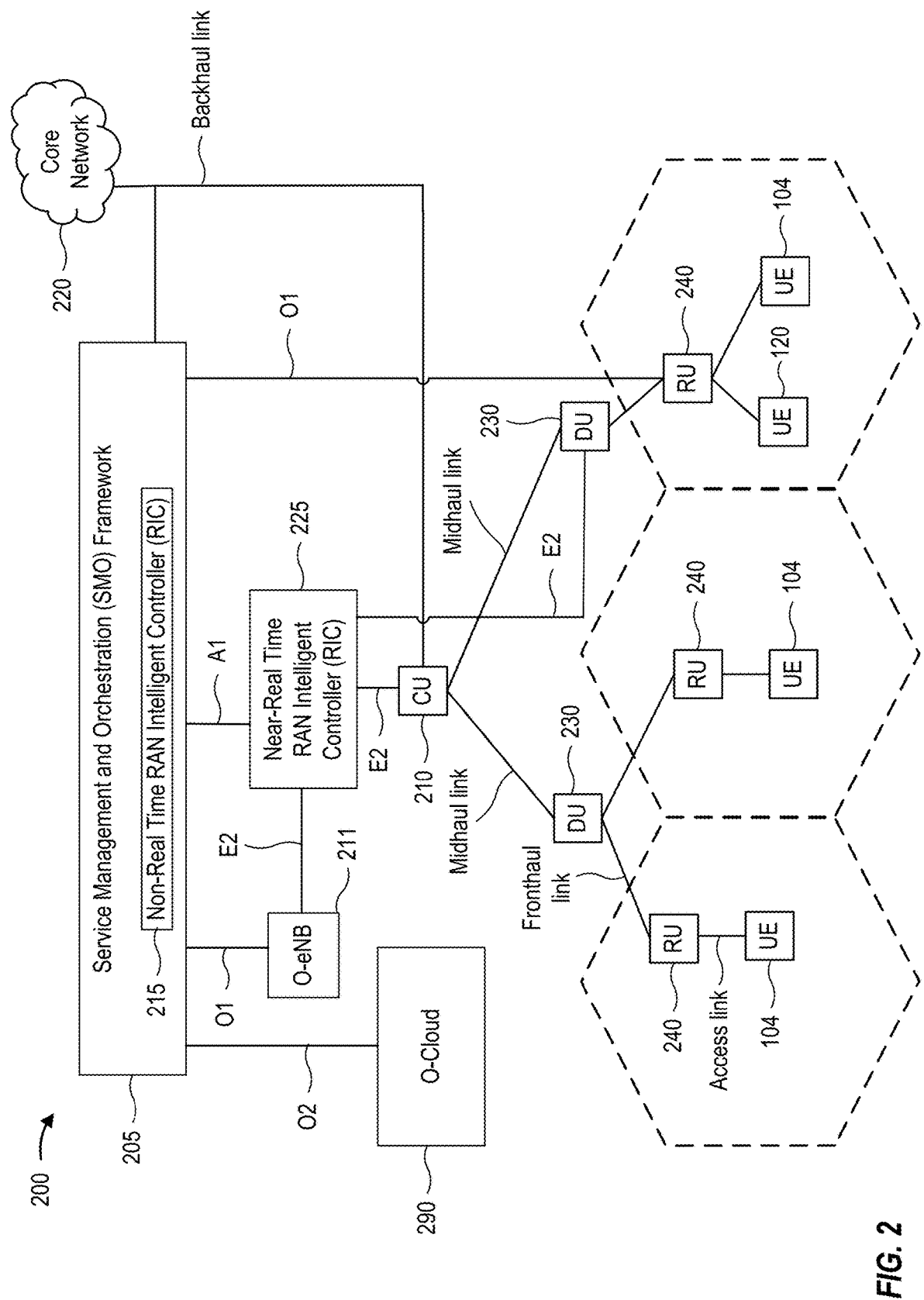
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5GNR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
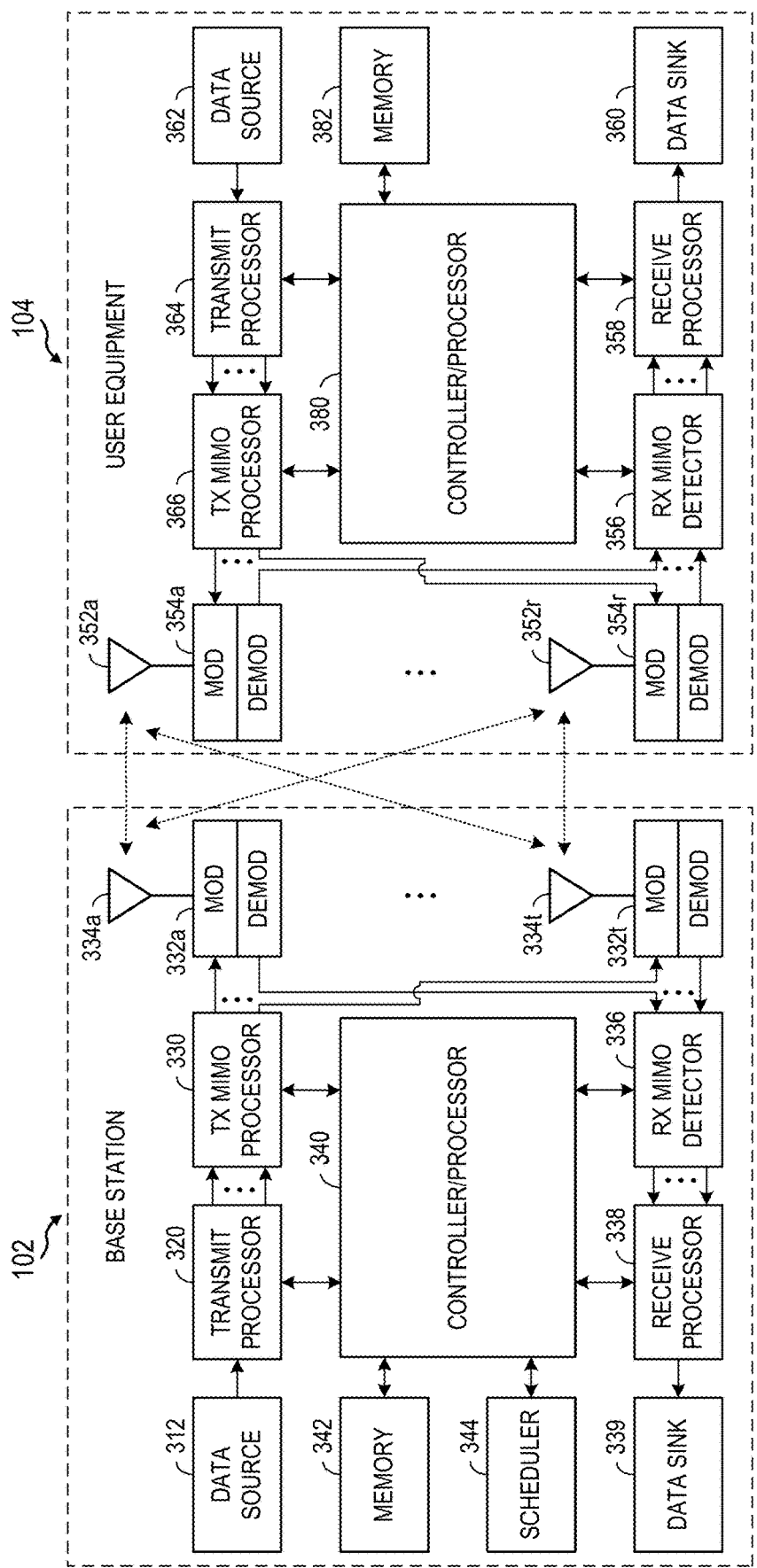
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5GNNR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Configuring Sidelink Carrier Aggregation

Figure 5:
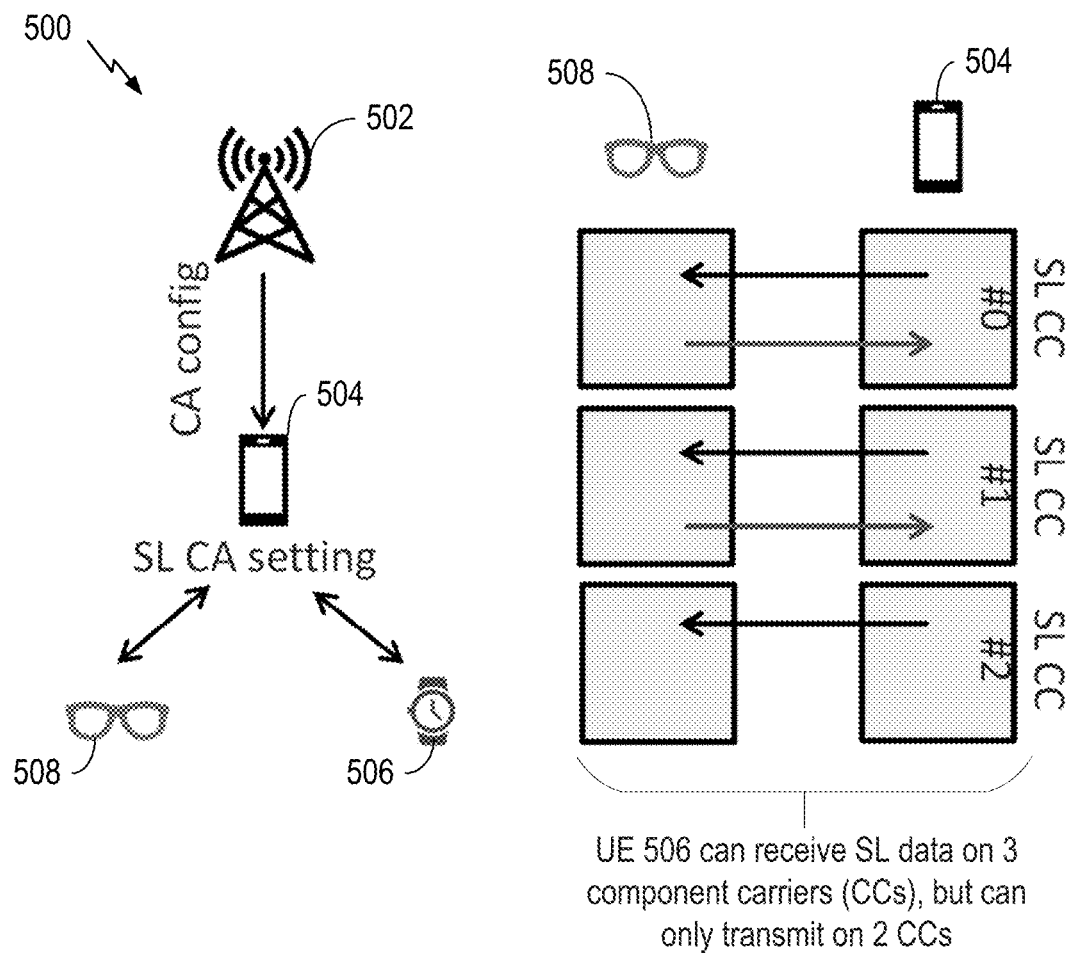
FIG. 5 depicts aspects related to enabling carrier aggregation for sidelink communications.

FIG. 5 depicts aspects related to enabling carrier aggregation for sidelink communications.

Initially, sidelink carrier aggregation can be configured in various ways. For example, a network entity, such as base station 502, can configure sidelink carrier aggregation settings for sidelink UEs, such as UE 504, by sending a sidelink carrier aggregation configuration comprising sidelink carrier aggregation settings. UE 504 can then act as a relay for the sidelink carrier aggregation settings by sending them to further sidelink UEs, such as a UEs 506 and 508

Alternatively, a group of UEs, (e.g., UEs 504, 506, and 508) may form a unicast/groupcast session during a PC5 link setup and configure sidelink carrier aggregation settings during the link setup. In one example, the setup could be transmitting device-centric, such that each UE indicates to another UE on which component carriers it is going to transmit, while taking the capabilities of the other UEs into account. As another example, for a managed groupcast, a group lead UE can decide the sidelink carrier aggregation configuration and indicate the settings to other UEs in the groupcast.

Generally, a sidelink carrier aggregation configuration may take into account the supported transmitting and receiving capabilities of different UEs (e.g., supported frequency bands/component carriers) participating in sidelink communications. This is because, similar to carrier aggregation for communications with a network entity (such as over a Uu link), each UE may have different capabilities. For example, a UE may be able to receive sidelink communications on a larger number of sidelink component carriers as compared to those on which it can transmit, such as depicted in FIG. 5 where UE 506 can receive sidelink data on three component carriers, but can only transmit on two component carriers.

In some aspects, a sidelink carrier aggregation configuration may include settings associated with the segmenting of sidelink transmissions, as described in further detail below.

Figure 6A:
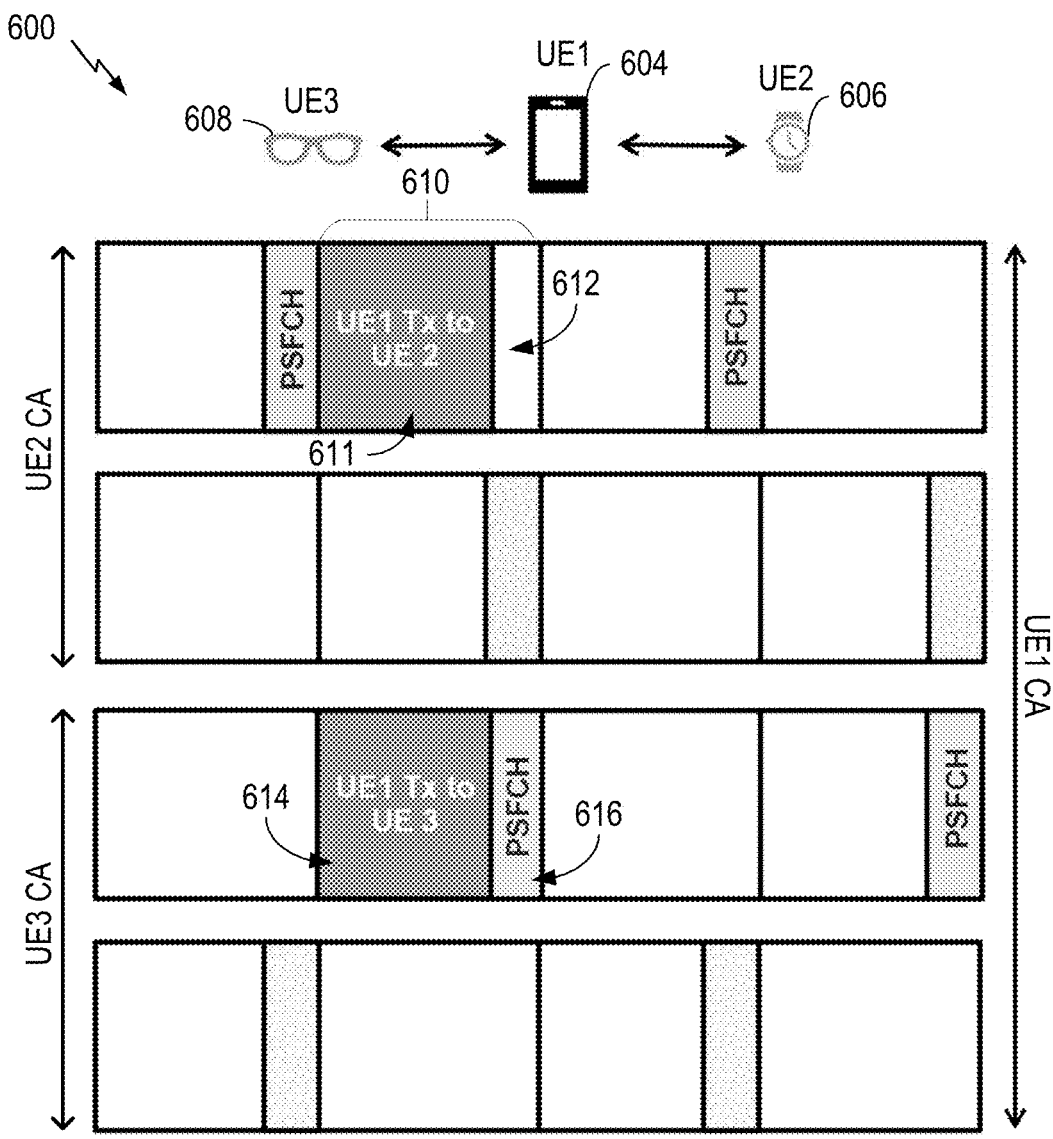
FIG. 6A depicts an example scenario in which a first UE is performing sidelink communications with a second UE and a third UE using aggregated component carriers.

Aspects Related to Transmission Alignment for Mini-Slots and Mixed Numerology Component Carriers FIG. 6A depicts an example scenario 600 in which a first UE 604 is performing sidelink communications with a second UE 606 and a third UE 608 using aggregated component carriers.

Figure 6B:
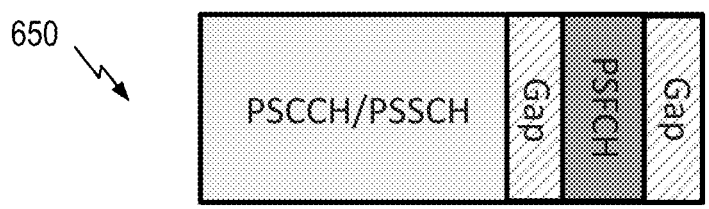
FIG. 6B depicts an example of a slot with gap symbols.

During slot 610, the first UE 604 is scheduled to transmit to third UE 608 data (e.g., on a PSCCH or PSSCH during a first portion 614 of slot 610 and then feedback on a PSFCH during a second portion 616 of slot 610. First UE 604 is concurrently scheduled to transmit data to second UE 606 during first portion 611 of slot 610. However, first UE 604 is not scheduled to transmit to second UE 606 during second portion 612 of slot 610. This is because, as depicted in example 650 of FIG. 6B, the second portion 616 of the scheduled transmission between first UE 604 and third UE 608 includes gap symbols separating the feedback from the other data transmission. Consequently, while transmitting portion 616 of slot 610, a power amplifier in first UE 604 will vary its power output as it observes the gap symbols (where nothing is transmitted), which will in-turn vary its phase as the power setting changes. To avoid the chance of losing phase continuity across the aggregated component carriers, the conventional solution is for first UE 604 to not transmit to second UE 606 during second portion 612 of slot 610, in other words, to cut slot 610 short on that component carrier. This conventional solution thus causes symbols within portion 612 of slot 610 to be wasted, and therefore induces transmission latency and reduces efficiency with respect to use of the medium.

Figure 7A:
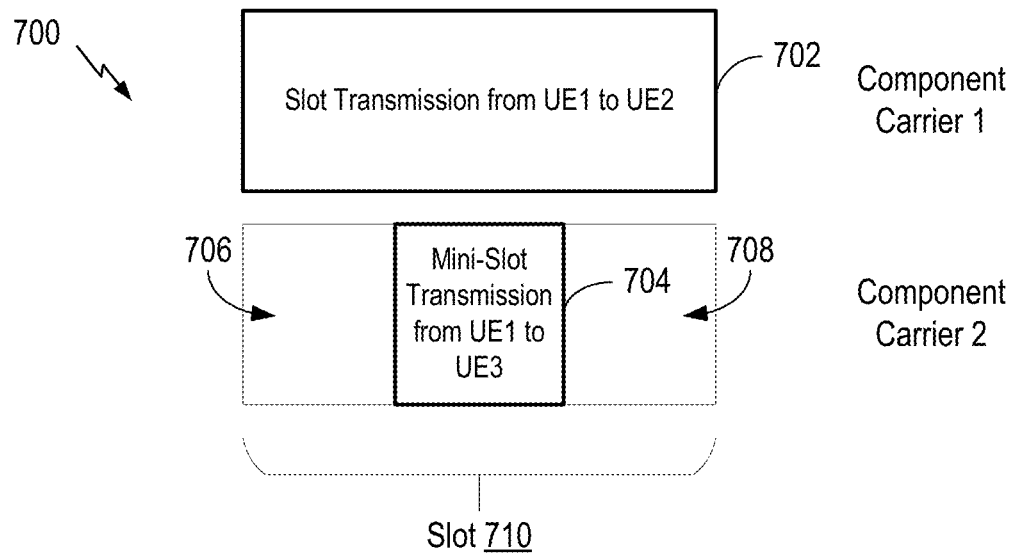
FIGS. 7A and 7B depict aspects related to segmenting transmissions to align transmission boundaries for mini-slots.
Figure 7B:
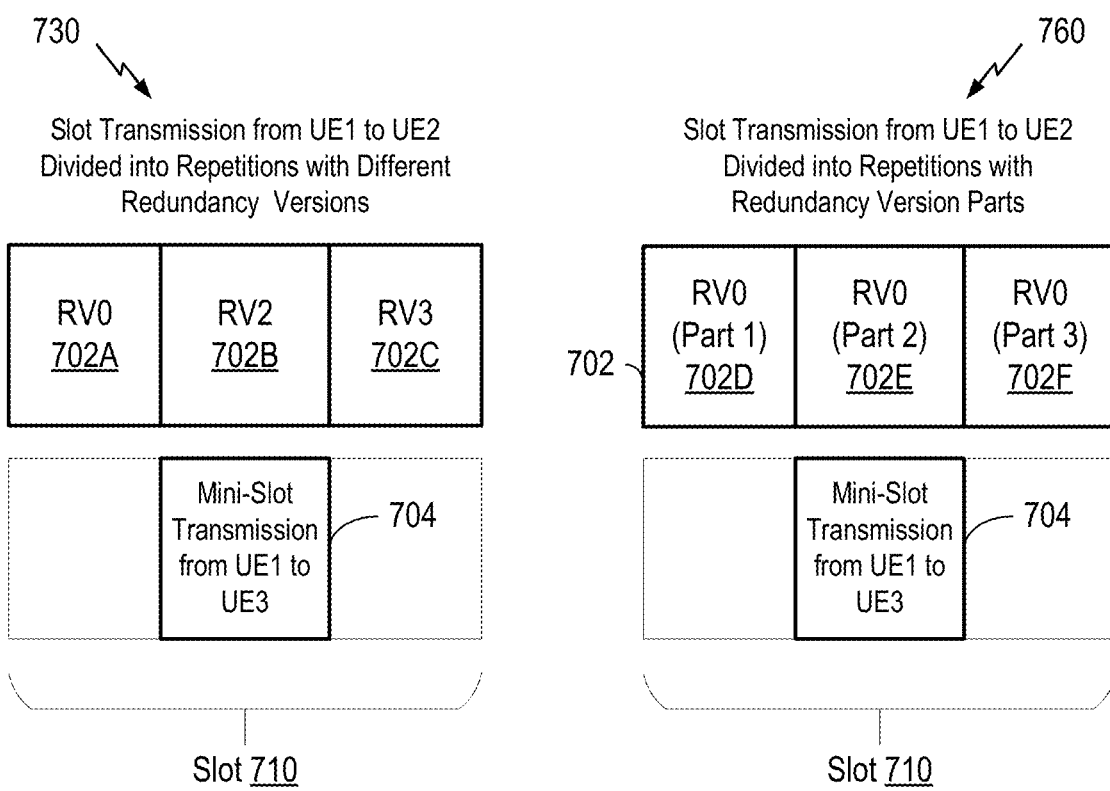

FIGS. 7A and 7B depict aspects related to segmenting transmissions to align transmission boundaries for mini-slots. For example, as depicted in FIG. 7A, the use of mini-slots (e.g., 704) in sidelink communications creates the same problem as described with respect to FIG. 6A, because mini-slots within a slot (e.g., 710) create transmission gaps (e.g., during portions 706 and 708 of slot 710) where nothing is transmitted, and therefore a power amplifier will vary its power settings during these gap periods within the slot. The conventional solution to dealing with this similar problem when using mini-slots is the same shortening concurrent transmissions on other component carriers to align transmission times and to avoid the loss of phase continuity across component carriers. Thus, in the example 700 of FIG. 7A, the slot transmission 702 from UE1 to UE2 would need to be shortened to align with mini-slot transmission 704 from UE1 to UE3 causing the same network inefficiencies as discussed above.

Aspects described herein overcome the aforementioned problems by segmenting a longer transmission within a first component carrier to align boundaries with Hall shorter, concurrent transmissions in a second component carrier so that phase continuity and transmission coherency is maintained within each segment. Notably, the segmentation allows the entire slot may to be used for transmission, while still aligning sub-slot transmissions with the segment(s). This allows for recapturing the lost transmission opportunities, such as described above with respect to second portion 612 of slot 610 in FIG. 6A, or with respect to portions 706 and 708 of slot 710 in FIG. 7A, and therefore beneficially reduces latency and increases efficiency of the medium.

For example, FIG. 7B depicts an example of segmenting slot transmission 702 from FIG. 7A into three segments (or repetitions) 702A-C in example 730 and 702D-E in example 760. Notably, these segments allow for aligning transmission boundaries with mini-slot 704. In particular, in this example, segment 702B in example 730 is aligned with the boundaries of mini-slot 704 and segment 702E in example 760 is aligned with the boundaries of mini-slot 704. Because each of the different segments is configured as a separate transmission, the power amplifier settings during the different segments will be consistent, and phase continuity and transmission coherency will be maintained within the segments 702A-C or 702D-E between the component carriers.

FIG. 7B further depicts two different techniques for segmenting slot 702. In example 730, each of the segments 702A-C is associated with a different redundancy version for a circular buffer (an example of which is described with respect to FIG. 10A). In example 760, each of the segments 702D is associated with a different transmission part, each using the same redundancy version (an example of which is described with respect to FIG. 10B).

Figure 8A:
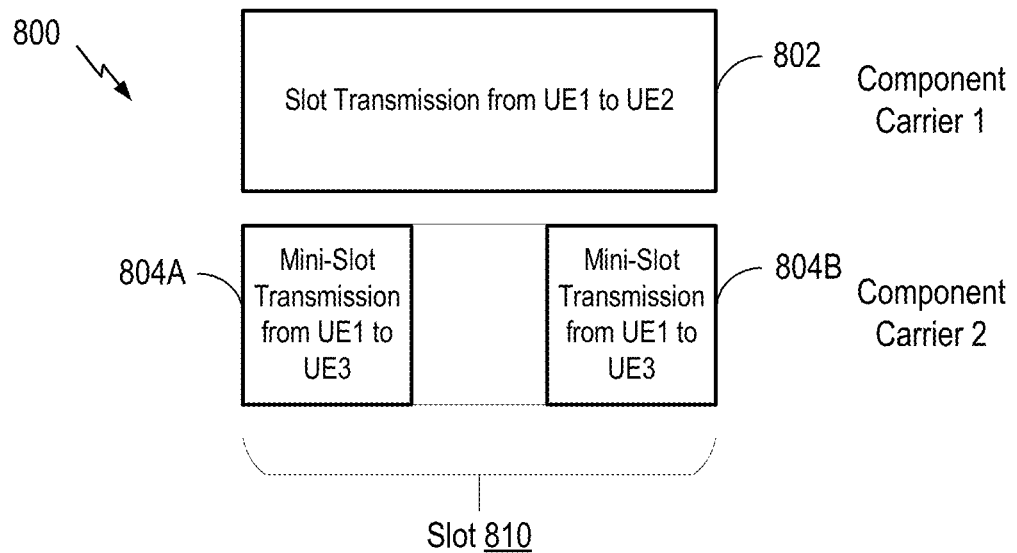
FIGS. 8A and 8B depict aspects related to segmenting transmissions to align transmission boundaries for mini-slots.

FIG. 8A depicts another example in which a slot-length transmission 802 on a first component carrier is scheduled concurrently with two mini-slot transmissions, 804A and 804B, on a second component carrier.

Figure 8B:
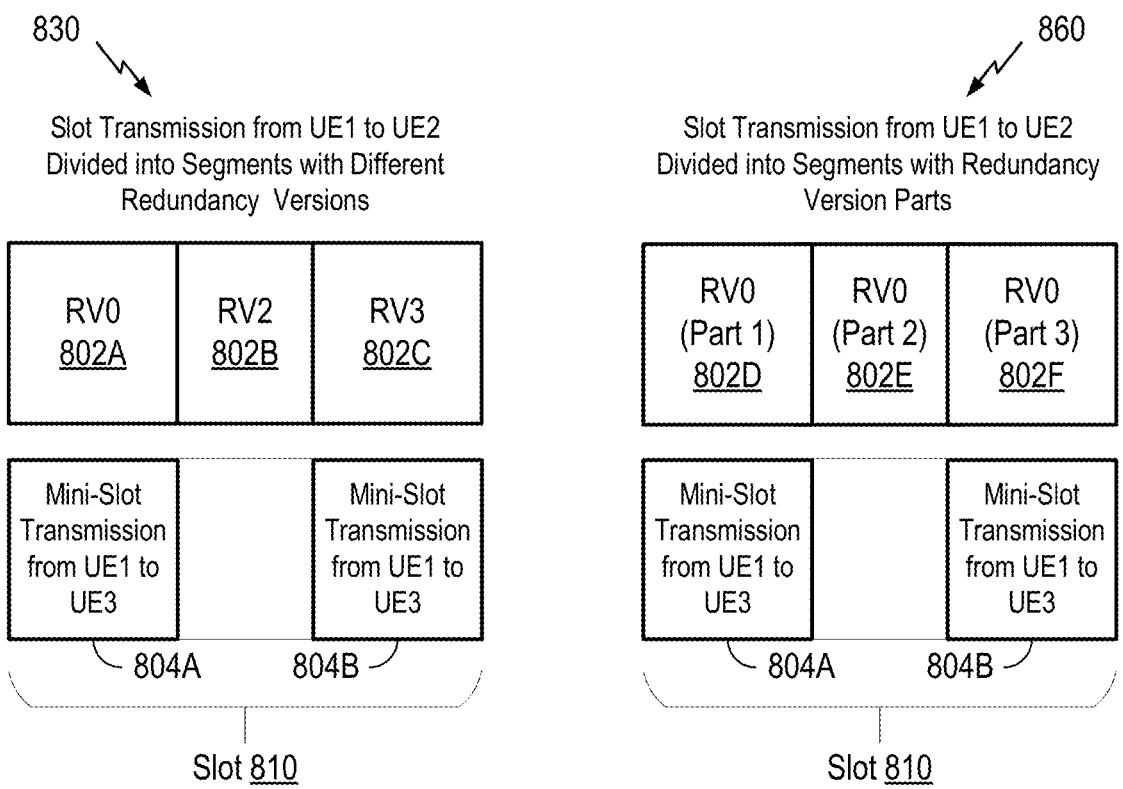

FIG. 8B depicts an example of segmenting slot transmission 802 from FIG. 8A into three segments (e.g., segments 802A-C in example 830 and segments 802D-F in example 860), which align transmission boundaries with mini-slots 804A and 804B. Here again, because each of the different segments is configured as a separate transmission, the power amplifier settings during the different segments will be consistent, and phase continuity and transmission coherency will be maintained within the segments 802A-C or segment 802D-F between the component carriers.

Further, FIG. 8B depicts two different techniques for segmenting slot transmission 802. In example 830, each of the segments 802A-C is associated with a different redundancy version for a circular buffer (an example of which is described with respect to FIG. 10A). In example 860, each of the segments 802D-F is associated with a different transmission part, each using the same redundancy version (an example of which is described with respect to FIG. 10B).

Figure 9A:
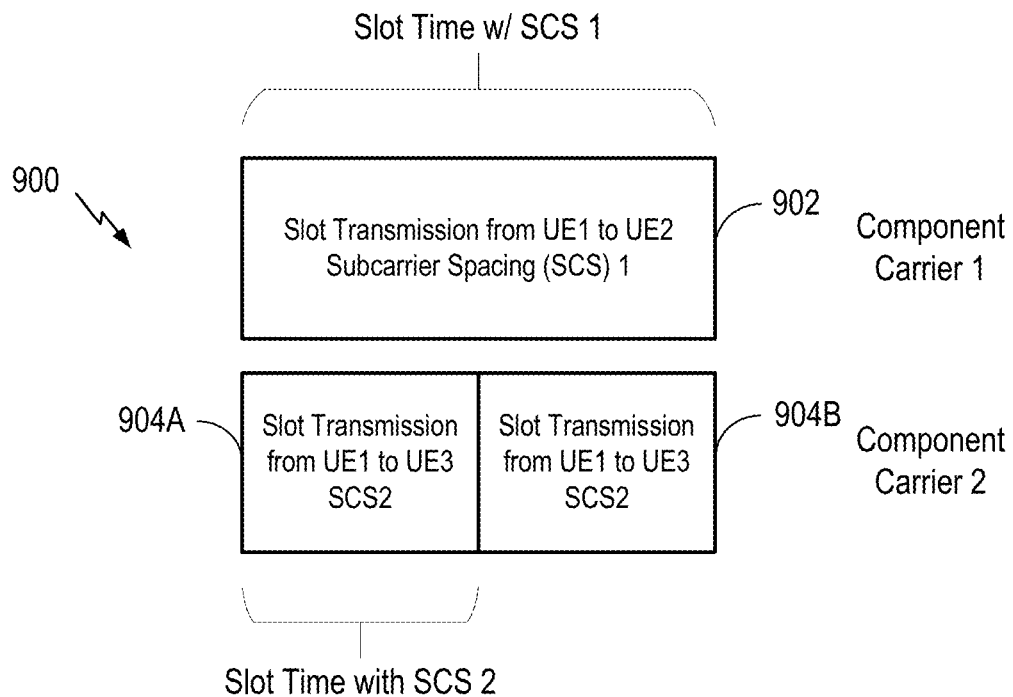
FIGS. 9A and 9B depict aspects related to segmenting transmissions to align transmission boundaries for transmissions using different numerologies.

FIG. 9A depicts an example 900 in which a slot-length transmission 902 using a first numerology (e.g., a first subcarrier spacing) on a first component carrier is scheduled concurrently with two slot transmissions, 904A and 904B, using a second numerology (e.g., a second subcarrier spacing) on a second component carrier. In particular, in this example, the transmission 902 is using a smaller subcarrier spacing than transmissions 904A and 904B. Generally, as the subcarrier spacing increases, the symbol time decreases, and therefore the slot length also decreases. Thus, it is possible for the two transmissions 904A and 904B using the larger subcarrier spacing to fit within the same time as the single slot transmission 9024 using the smaller subcarrier spacing.

Figure 9B:
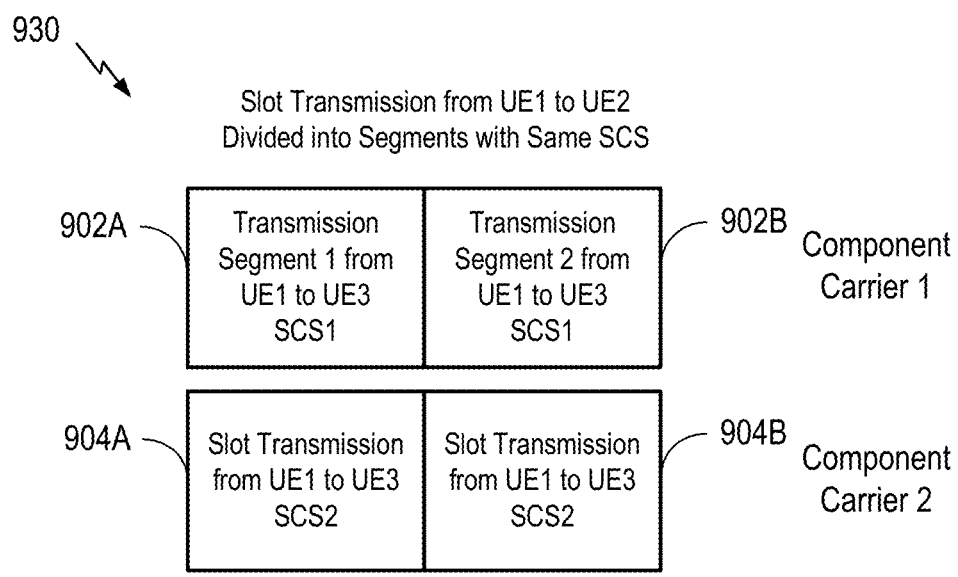

To align the transmissions boundaries, transmission 902 may be split into two segments, 902A and 902B as depicted in FIG. 9B. As in the previous examples, this aligns the transmission boundaries between transmissions 902A, 902B and 904A, 904B.

FIGS. 7A-9B generally describe different techniques for aligning transmissions using mini-slots and mixed numerology component carriers. In some aspects, it may be desirable to instead cancel a transmission, such as the shorter transmission. For example, with respect to example 730 of FIG. 7B, and alternative to alignment is to cancel the mini-slot transmission 704.

Cancelling a transmission rather than aligning it via segmentation as described above may be selected in various scenarios. For example, if the shorter transmission is a low priority transmission (e.g., is associated with a low QoS), then it may be cancelled (and rescheduled) instead. As another example, if the number of symbols in the shorter transmission is less than a threshold number of symbols, then then it may be cancelled (and rescheduled). Generally, such a threshold may be configured by a network entity, such a base station described above. In some aspects, the threshold may be configured per resource pool (e.g., by RRC signaling from a network entity). In some cases, a combination of the aforementioned factors may be used as logic for cancelling and rescheduling the shorter transmission.

Indicating Segmentation of Transmissions for Alignment

In the examples described above with respect to FIGS. 7A-9B, a transmitting UE (e.g., a first sidelink UE) is sending a longer transmission (e.g., a slot-length or legacy transmission, or a transmission with a smaller subcarrier spacing) to a first receiving UE (e.g., a second sidelink UE) and a shorter transmission (e.g., one or more mini-slots, or a transmission with a larger subcarrier spacing) to a second receiving UE (e.g., a third sidelink UE). In some aspects, both of the receiving UEs use the same component carriers.

For example, the same two aggregated component carriers are used to make the transmissions to the first and the second receiving UEs. In other aspects, the transmitting UE uses different component carriers to transmit to the two receiving UEs. These two scenarios affect how the transmitting UE can indicate segmentation (as described with respect to FIGS. 7A-9B) to the receiving UEs.

In the case of using the same component carriers for transmitting to the two receiving UEs, the transmitting UE can indicate in the first component carrier or the second component carrier the segmentation that it will use. Generally, this indication can be performed via layer 1, layer 2, or layer 3 messaging. For example, the indication may be by layer 1 sidelink control information (SCI) carried on the PSCCH (e.g., SCI1) or by SCI carried on the PSSCH (e.g., SCI2), which may be multiplexed with data. As another example, the indication may be by layer 2 medium access control control element over the PC5 link (e.g., PC5-MAC-CE) between the transmitting and receiving sidelink UEs. As yet another example, the indication may be by layer 3 radio resource control signaling over the PC5 link (e.g., PC5-RRC).

In the case of using different component carriers for transmitting to the two receiving UEs, the transmitting UE can indicate in the smaller numerology or longer transmission component carrier the segmentation that it will use. As above, this indication can be performed via layer 1, layer 2, or layer 3 messaging, including SCI (e.g., SCI1 or SCI2), PC5-MAC-CE, or PC5-RRC.

In either case described above, if MAC-CE or RRC are used to indicate the segmentation, then a transmission window may be defined and configured such that transmissions in the transmission window will follow the indicated segmentation configuration.

Sidelink Control Information and Redundancy Version Design

As described above with respect to FIGS. 7A-9B, a transmitting UE may use different redundancy versions related to a circular transmission buffer for different transmission segments (or repetitions).

In some aspects, a single SCI may be used across the segmentations to avoid the overhead cost of per segmentation SCI. Thus, when a transmitting UE indicates its reserved/scheduled resources, it may still make the indication using a slot-based technique or the legacy technique.

In various aspects, a transmitting UE may indicate the redundancy version(s) of a segmented transmission via layer 1, layer 2, or layer 3 messaging. For example, the transmitting UE may indicate the redundancy version(s) via layer 1 messaging that defines a sequence of redundancy versions using SCI (e.g., SCI-2). As another example, the transmitting UE may indicate the redundancy version(s) via layer 2 messaging that defines a sequence of redundancy versions using MAC-CEs. As yet another example, the transmitting UE may indicate the redundancy version(s) via layer 3 messaging that defines a sequence of redundancy versions using RRC signaling. In some aspects, a combination of layer 1, layer 2, and/or layer 3 signaling may be used. For example, layer 3 signaling may define multiple sequences, layer 2 signaling may selects a subset of the multiple sequences to be used, and layer 1 signaling may indicate the specific sequence in the subset of sequences to be used.

In some aspects, the redundancy version configuration may be based on a procedure and an initial redundancy version index. For example, when a longer transmission is split into segments around mini-slots used by the transmitting UE for transmitting to a receiving UE (e.g., as in the examples described with respect to FIGS. 7A-8B), assume $RV_k \in \{0, 2, 3, 1\}$ is chosen in the kth segment (or repetition), then the UE will use this $RV_k$ as follows: if this segment was not shortened (e.g., the shorter transmission was canceled), then the transmitting UE may map the bits into the originally configured resource elements.

If, on the other hand, the longer transmission is divided into shorter segments, then the transmitting UE may map the redundancy version bits in each segment based on the number of resource elements in each segment. The starting bit in the first segment may be based on the associated redundancy version (e.g., $RV_k$) while the starting bits of the rth segment of the k segments is based on the last bit of the (r-1)th actual segment. For example, from bit 0 to x for segment number 1, from bit x+1 to y for the second segment, from bit y+1 to z for the third segment, and so on. This can be viewed as mapping the bits based on the data in the resource elements associated with the k segments.

Figure 10A:
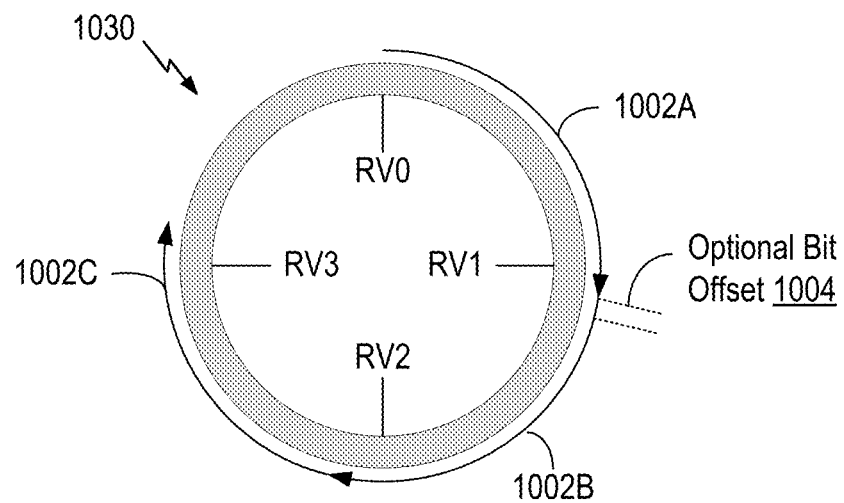
FIGS. 10A and 10B depicts aspects related to mapping segmented transmissions to circular buffers using redundancy versions.
Figure 10B:
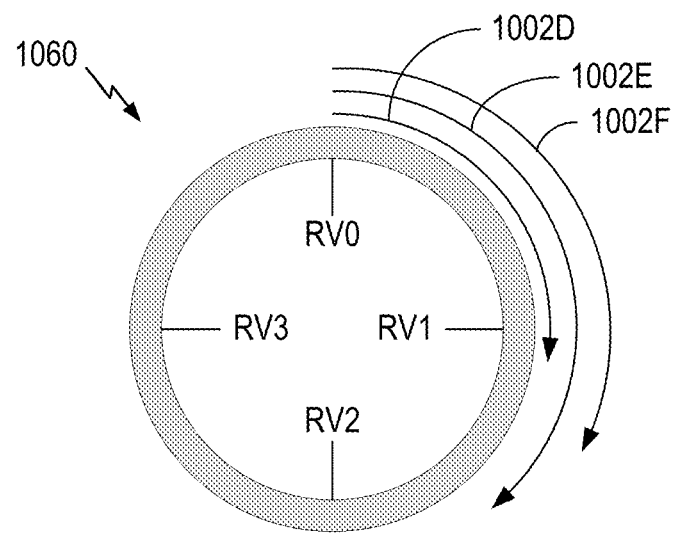

For example, FIGS. 10A and 10B depict example aspects related to mapping segmented transmissions to circular buffers using redundancy versions. With reference to FIG. 10A, assume that a transmission is split into three segments (e.g., as in the examples of FIGS. 7B and 8B) and the starting redundancy version is RV0, then the segments may be mapped to bits in the circular buffer 1030 based on the redundancy version starting point as shown by arrows 1002A-C.

In some aspects, the transmitting UE could be configured to make a bit offset between one segments ending bit and the following segments starting bit, as depicted by optional bit offset 1004. For example, this could be configured by a network entity using layer 1, layer 2, or layer 3 signaling, such as downlink control information (DCI), MAC-CE, or RRC signaling over a Uu link.

FIG. 10B depicts an alternative example where a transmitting UE maps different segments to circular buffer 1060 using the same redundancy version as a bit starting point, but transmits the different segments in separate parts (e.g., 1002D-F).

Example Operations of a User Equipment

Figure 11:
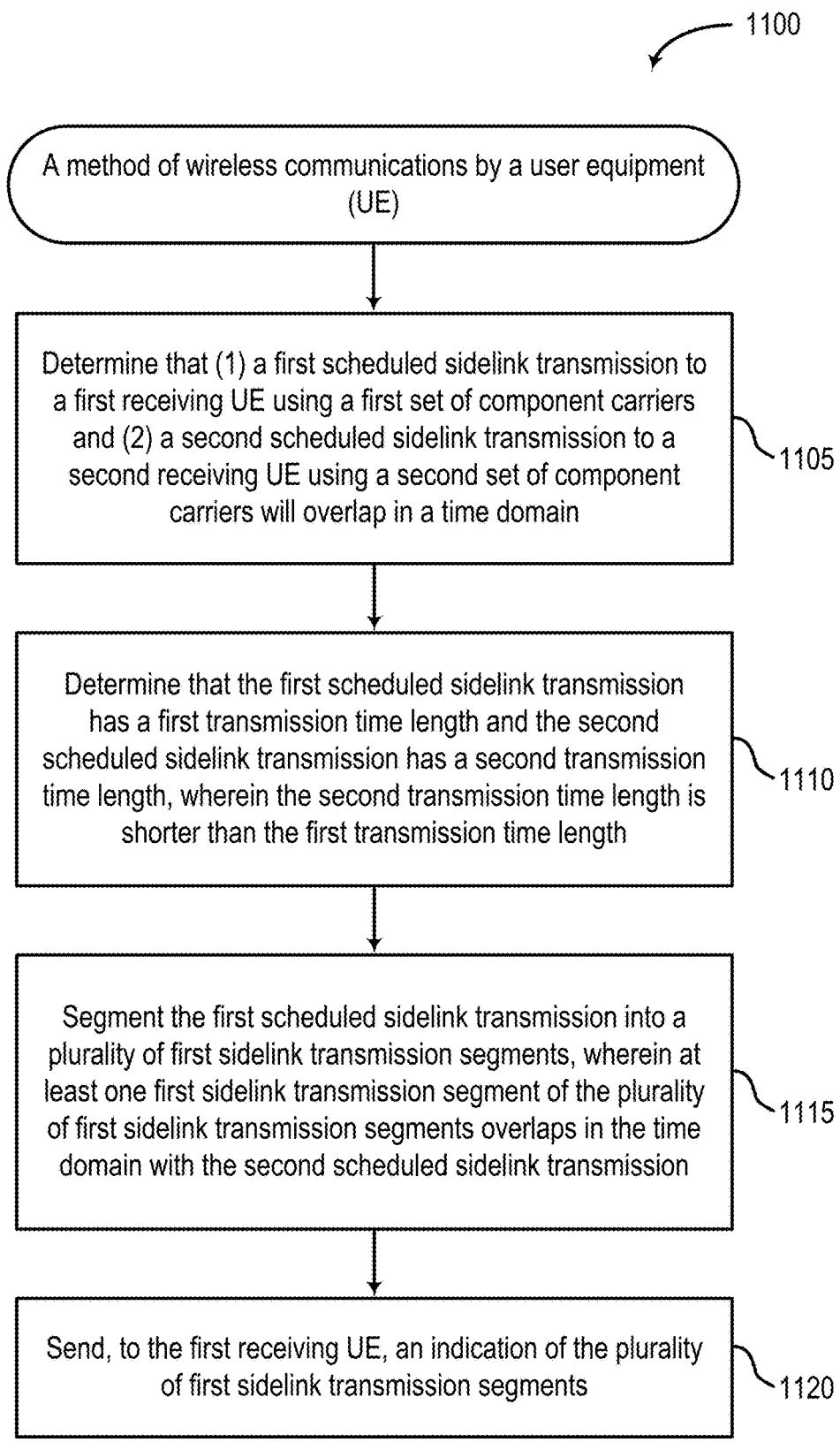
FIG. 11 depicts a method for wireless communications.

FIG. 11 shows an example of a method 1100 for wireless communications by a UE, such as UE 104 of FIGS. 1 and 3.

Method 1100 begins at step 1105 with determining that (1) a first scheduled sidelink transmission to a first receiving UE using a first set of component carriers and (2) a second scheduled sidelink transmission to a second receiving UE using a second set of component carriers will overlap in a time domain. In some cases, the operations of this step refer to, or may be performed by, circuitry for determining and/or code for determining as described with reference to FIG. 13.

Method 1100 then proceeds to step 1110 with determining that the first scheduled sidelink transmission has a first transmission time length and the second scheduled sidelink transmission has a second transmission time length, wherein the second transmission time length is shorter than the first transmission time length. In some cases, the operations of this step refer to, or may be performed by, circuitry for determining and/or code for determining as described with reference to FIG. 13.

Method 1100 then proceeds to step 1115 with segmenting the first scheduled sidelink transmission into a plurality of first sidelink transmission segments, wherein at least one first sidelink transmission segment of the plurality of first sidelink transmission segments overlaps in the time domain with the second scheduled sidelink transmission. In some cases, the operations of this step refer to, or may be performed by, circuitry for segmenting and/or code for segmenting as described with reference to FIG. 13.

Method 1100 then proceeds to step 1120 with sending, to the first receiving UE, an indication of the plurality of first sidelink transmission segments. In some cases, the operations of this step refer to, or may be performed by, circuitry for sending and/or code for sending as described with reference to FIG. 13.

In some aspects, indicating the plurality of first sidelink transmission segments to the first receiving UE comprises one or more of: sending SCI via one of a PSSCH or a PSCCH that indicates the plurality of first sidelink transmission segments; sending a MAC-CE via a PC5 connection that indicates the plurality of first sidelink transmission segments; or sending a RRC message via the PC5 connection that indicates the plurality of first sidelink transmission segments.

In some aspects, the indication defines a sequence of redundancy versions associated with the plurality of first sidelink transmission segments.

In some aspects, at least one first sidelink transmission segment of the plurality of first sidelink transmission segments is configured with a redundancy version different than at least one other first sidelink transmission segment of the plurality of first sidelink transmission segments.

In some aspects, each first sidelink transmission segment of the plurality of first sidelink transmission segments is configured with a same redundancy version.

In some aspects, the method 1100 further includes mapping resource elements associated with each respective first sidelink transmission segment of the plurality of first sidelink transmission segments sequentially in a circular buffer with a starting bit for the respective first sidelink transmission segment based on a redundancy version associated with the respective first sidelink transmission segment. In some cases, the operations of this step refer to, or may be performed by, circuitry for mapping and/or code for mapping as described with reference to FIG. 13.

In some aspects, the first set of component carriers and the second set of component carriers comprise the same component carriers.

In some aspects, the method 1100 further includes indicating the first scheduled sidelink transmission to the first receiving UE and the second scheduled sidelink transmission to the second receiving UE using any component carrier in the first set of component carriers. In some cases, the operations of this step refer to, or may be performed by, circuitry for indicating and/or code for indicating as described with reference to FIG. 13.

In some aspects, the first set of component carriers and the second set of component carriers comprise different component carriers.

In some aspects, the method 1100 further includes indicating the first scheduled sidelink transmission to the first receiving UE and the second scheduled sidelink transmission to the second receiving UE using any component carrier in the first set of component carriers. In some cases, the operations of this step refer to, or may be performed by, circuitry for indicating and/or code for indicating as described with reference to FIG. 13.

In some aspects, the first scheduled sidelink transmission is configured with a lower subcarrier spacing than the second scheduled sidelink transmission.

In some aspects, the first scheduled sidelink transmission comprises a slot-length transmission, and the second scheduled sidelink transmission comprises a mini-slot-length transmission. For example, a slot-length transmission in certain aspects may comprise 14 symbols, and a mini-slot-length transmission may be less than a slot length in duration (e.g., may comprise fewer than 14 symbols). In sidelink transmissions, a slot may include a gap symbol as the last symbol, and so may generally have 13 symbols available for data when no feedback is used, and 10 symbols for data when feedback is used. Note that these are just some examples, and other slot structures are possible.

In some aspects, the first set of component carriers are an intra-band set of component carriers.

Figure 13:
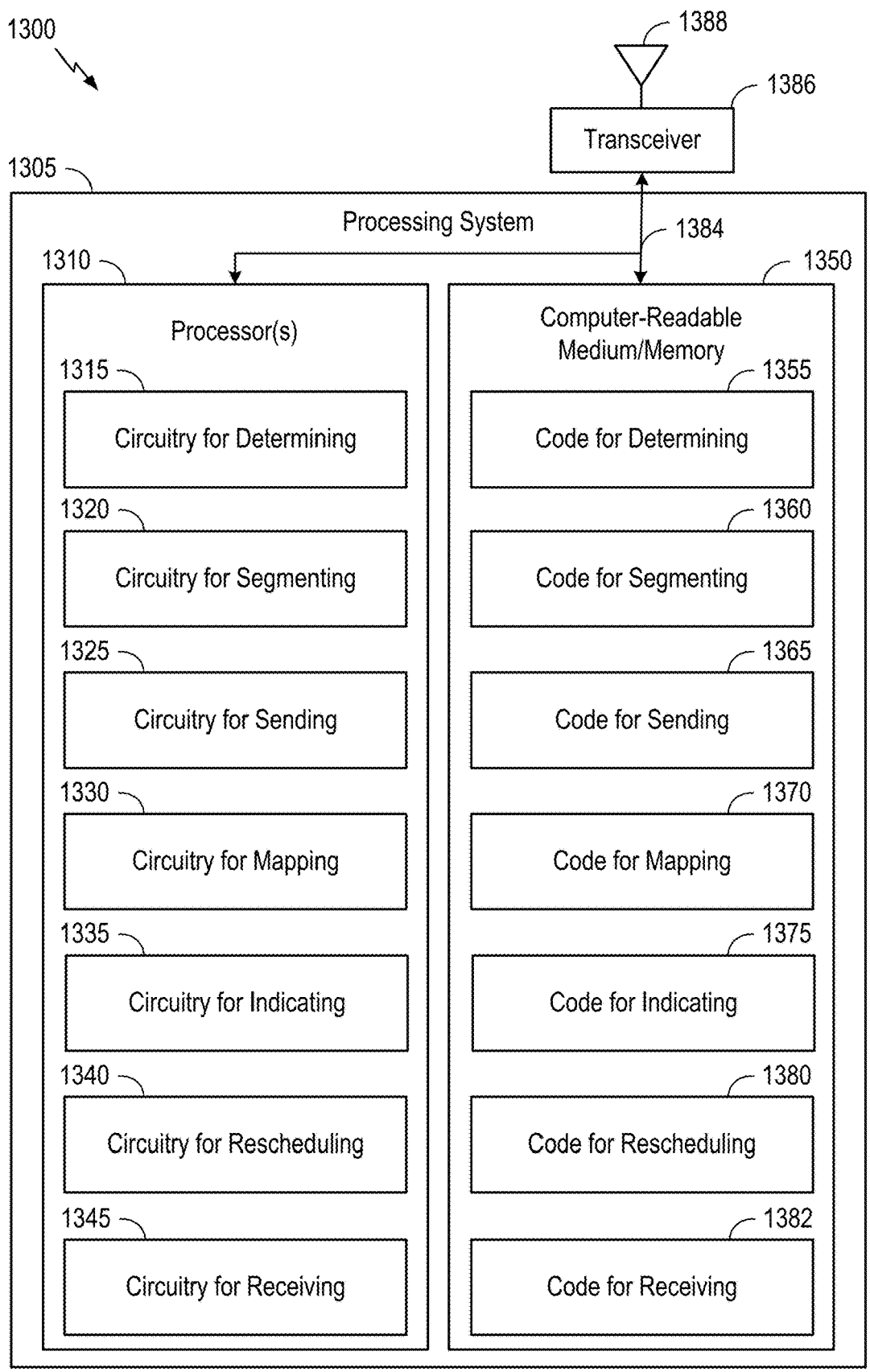
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100.

Communications device 1300 is described below in further detail.

Note that FIG. 11 is just one example of a method, and other methods including fewer, additional, or alternative steps are possible and consistent with this disclosure.

Figure 12:
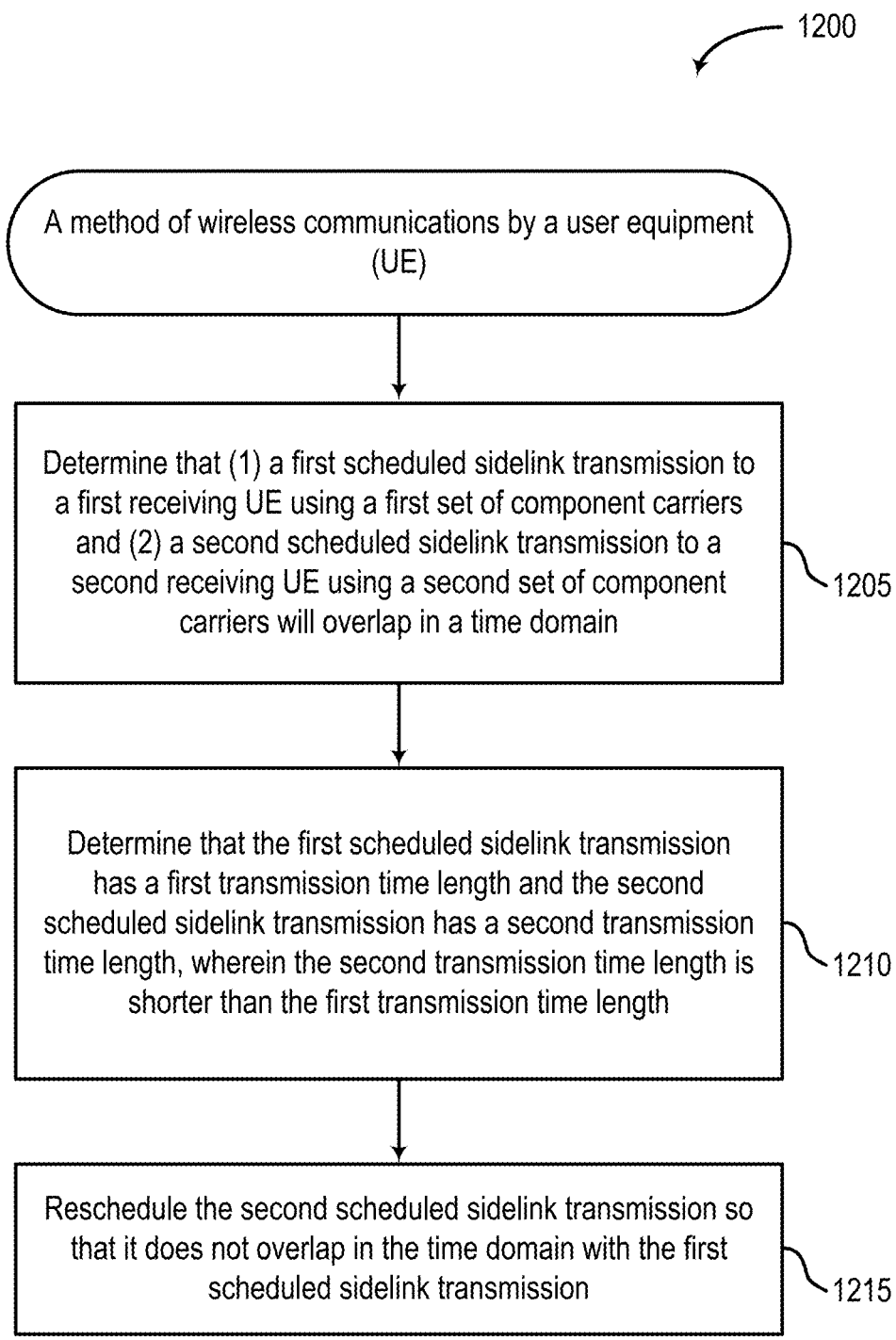
FIG. 12 depicts a method for wireless communications.

FIG. 12 shows an example of a method 1200 for wireless communications by a UE, such as UE 104 of FIGS. 1 and 3.

Method 1200 begins at step 1205 with determining that (1) a first scheduled sidelink transmission to a first receiving UE using a first set of component carriers and (2) a second scheduled sidelink transmission to a second receiving UE using a second set of component carriers will overlap in a time domain. In some cases, the operations of this step refer to, or may be performed by, circuitry for determining and/or code for determining as described with reference to FIG. 13.

Method 1200 then proceeds to step 1210 with determining that the first scheduled sidelink transmission has a first transmission time length and the second scheduled sidelink transmission has a second transmission time length, wherein the second transmission time length is shorter than the first transmission time length. In some cases, the operations of this step refer to, or may be performed by, circuitry for determining and/or code for determining as described with reference to FIG. 13.

Method 1200 then proceeds to step 1215 with rescheduling the second scheduled sidelink transmission so that it does not overlap in the time domain with the first scheduled sidelink transmission. In some cases, the operations of this step refer to, or may be performed by, circuitry for rescheduling and/or code for rescheduling as described with reference to FIG. 13.

In some aspects, rescheduling the second scheduled sidelink transmission is based at least in part on the second scheduled sidelink transmission having one of a lower priority or a lower quality of service than the first scheduled sidelink transmission.

In some aspects, rescheduling the second scheduled sidelink transmission is based at least in part on the second scheduled sidelink transmission comprising a number of symbols lower than a threshold number of symbols.

In some aspects, the method 1200 further includes receiving, from a network entity, an indication of the threshold number of symbols. In some cases, the operations of this step refer to, or may be performed by, circuitry for receiving and/or code for receiving as described with reference to FIG. 13.

In some aspects, the threshold number of symbols is configured based on a resource pool that is to be used by the UE for the first scheduled sidelink transmission and the second scheduled sidelink transmission.

In some aspects, the first scheduled sidelink transmission comprises a slot-length transmission, and the second scheduled sidelink transmission comprises a mini-slot-length transmission.

In some aspects, the first set of component carriers are an intra-band set of component carriers.

In one aspect, method 1200, or any aspect related to it, may be performed by an apparatus, such as communications device 1300 of FIG. 13, which includes various components operable, configured, or adapted to perform the method 1200. Communications device 1300 is described below in further detail.

Note that FIG. 12 is just one example of a method, and other methods including fewer, additional, or alternative steps are possible and consistent with this disclosure.

Example Communications Device

FIG. 13 depicts aspects of an example communications device 1300. In some aspects, communications device 1300 is a user equipment, such as UE 104 described above with respect to FIGS. 1 and 3.

The communications device 1300 includes a processing system 1305 coupled to the transceiver 1386 (e.g., a transmitter and/or a receiver). The transceiver 1386 is configured to transmit and receive signals for the communications device 1300 via the antenna 1388, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. The one or more processors 1310 are coupled to a computer-readable medium/memory 1350 via a bus 1384. In certain aspects, the computer-readable medium/memory 1350 is configured to store instructions (e.g., computer-executable code) that when executed by the one or more processors 1310, cause the one or more processors 1310 to perform the method 1100 described with respect to FIG. 11, or any aspect related to it, and/or the method 1200 described with respect to FIG. 12, or any aspect related to it. Note that reference to a processor performing a function of communications device 1300 may include one or more processors 1310 performing that function of communications device 1300.

In the depicted example, computer-readable medium/memory 1350 stores code (e.g., executable instructions), such as code for determining 1355, code for segmenting 1360, code for sending 1365, code for mapping 1370, code for indicating 1375, code for rescheduling 1380, and code for receiving 1382. Processing of the code for determining 1355, code for segmenting 1360, code for sending 1365, code for mapping 1370, code for indicating 1375, code for rescheduling 1380, and code for receiving 1382 may cause the communications device 1300 to perform the method 1100 described with respect to FIG. 11, or any aspect related to it, and/or the method 1200 described with respect to FIG. 12, or any aspect related to it.

The one or more processors 1310 include circuitry configured to implement (e.g., execute) the code stored in the computer-readable medium/memory 1350, including circuitry such as circuitry for determining 1315, circuitry for segmenting 1320, circuitry for sending 1325, circuitry for mapping 1330, circuitry for indicating 1335, circuitry for rescheduling 1340, and circuitry for receiving 1345. Processing with circuitry for determining 1315, circuitry for segmenting 1320, circuitry for sending 1325, circuitry for mapping 1330, circuitry for indicating 1335, circuitry for rescheduling 1340, and circuitry for receiving 1345 may cause the communications device 1300 to perform the method 1100 described with respect to FIG. 11, or any aspect related to it, and/or the method 1200 described with respect to FIG. 12, or any aspect related to it.

Various components of the communications device 1300 may provide means for performing the method 1100 described with respect to FIG. 11, or any aspect related to it, and/or the method 1200 described with respect to FIG. 12, or any aspect related to it. For example, means for transmitting, sending or outputting for transmission may include transceivers 354 and/or antenna(s) 352 of the UE 104 illustrated in FIG. 3 and/or the transceiver 1386 and the antenna 1388 of the communications device 1300 in FIG. 13. Means for receiving or obtaining may include transceivers 354 and/or antenna(s) 352 of the UE 104 illustrated in FIG. 3 and/or the transceiver 1386 and the antenna 1388 of the communications device 1300 in FIG. 13.

Example Clauses

Implementation examples are described in the following numbered clauses:

Clause 1: A method of wireless communications by a UE, comprising: determining that (1) a first scheduled sidelink transmission to a first receiving UE using a first set of component carriers and (2) a second scheduled sidelink transmission to a second receiving UE using a second set of component carriers will overlap in a time domain; determining that the first scheduled sidelink transmission has a first transmission time length and the second scheduled sidelink transmission has a second transmission time length, wherein the second transmission time length is shorter than the first transmission time length; segmenting the first scheduled sidelink transmission into a plurality of first sidelink transmission segments, wherein at least one first sidelink transmission segment of the plurality of first sidelink transmission segments overlaps in the time domain with the second scheduled sidelink transmission; and sending, to the first receiving UE, an indication of the plurality of first sidelink transmission segments.

Clause 2: The method of Clause 1, wherein indicating the plurality of first sidelink transmission segments to the first receiving UE comprises one or more of: sending SCI via one of a PSSCH or a PSCCH that indicates the plurality of first sidelink transmission segments; sending a MAC-CE via a PC5 connection that indicates the plurality of first sidelink transmission segments; or sending a RRC message via the PC5 connection that indicates the plurality of first sidelink transmission segments.

Clause 3: The method of any one of Clauses 1 and 2, wherein the indication defines a sequence of redundancy versions associated with the plurality of first sidelink transmission segments.

Clause 4: The method of any one of Clauses 1-3, wherein at least one first sidelink transmission segment of the plurality of first sidelink transmission segments is configured with a redundancy version different than at least one other first sidelink transmission segment of the plurality of first sidelink transmission segments.

Clause 5: The method of any one of Clauses 1-4, wherein each first sidelink transmission segment of the plurality of first sidelink transmission segments is configured with a same redundancy version.

Clause 6: The method of any one of Clauses 1-5, further comprising: mapping resource elements associated with each respective first sidelink transmission segment of the plurality of first sidelink transmission segments sequentially in a circular buffer with a starting bit for the respective first sidelink transmission segment based on a redundancy version associated with the respective first sidelink transmission segment.

Clause 7: The method of any one of Clauses 1-6, wherein: the first set of component carriers and the second set of component carriers comprise the same component carriers, and the method further comprises indicating the first scheduled sidelink transmission to the first receiving UE and the second scheduled sidelink transmission to the second receiving UE using any component carrier in the first set of component carriers.

Clause 8: The method of any one of Clauses 1-7, wherein: the first set of component carriers and the second set of component carriers comprise different component carriers, and the method further comprises indicating the first scheduled sidelink transmission to the first receiving UE and the second scheduled sidelink transmission to the second receiving UE using any component carrier in the first set of component carriers.

Clause 9: The method of any one of Clauses 1-8, wherein the first scheduled sidelink transmission is configured with a lower subcarrier spacing than the second scheduled sidelink transmission.

Clause 10: The method of any one of Clauses 1-9, wherein: the first scheduled sidelink transmission comprises a slot-length transmission, and the second scheduled sidelink transmission comprises a mini-slot-length transmission.

Clause 11: The method of any one of Clauses 1-10, wherein the first set of component carriers are an intra-band set of component carriers.

Clause 12: A method of wireless communications by a UE, comprising: determining that (1) a first scheduled sidelink transmission to a first receiving UE using a first set of component carriers and (2) a second scheduled sidelink transmission to a second receiving UE using a second set of component carriers will overlap in a time domain; determining that the first scheduled sidelink transmission has a first transmission time length and the second scheduled sidelink transmission has a second transmission time length, wherein the second transmission time length is shorter than the first transmission time length; and rescheduling the second scheduled sidelink transmission so that it does not overlap in the time domain with the first scheduled sidelink transmission.

Clause 13: The method of Clause 12, wherein rescheduling the second scheduled sidelink transmission is based at least in part on the second scheduled sidelink transmission having one of a lower priority or a lower quality of service than the first scheduled sidelink transmission.

Clause 14: The method of any one of Clauses 12 and 13, wherein rescheduling the second scheduled sidelink transmission is based at least in part on the second scheduled sidelink transmission comprising a number of symbols lower than a threshold number of symbols.

Clause 15: The method of Clause 14, further comprising: receiving, from a network entity, an indication of the threshold number of symbols.

Clause 16: The method of Clause 14, wherein the threshold number of symbols is configured based on a resource pool that is to be used by the UE for the first scheduled sidelink transmission and the second scheduled sidelink transmission.

Clause 17: The method of any one of Clauses 12-16, wherein: the first scheduled sidelink transmission comprises a slot-length transmission, and the second scheduled sidelink transmission comprises a mini-slot-length transmission.

Clause 18: The method of any one of Clauses 12-17, wherein the first set of component carriers are an intra-band set of component carriers.

Clause 19: An apparatus, comprising: a memory comprising executable instructions; and a processor configured to execute the executable instructions and cause the apparatus to perform a method in accordance with any one of Clauses 1-18.

Clause 20: An apparatus, comprising means for performing a method in accordance with any one of Clauses 1-18.

Clause 21: A non-transitory computer-readable medium comprising executable instructions that, when executed by a processor of an apparatus, cause the apparatus to perform a method in accordance with any one of Clauses 1-18.

Clause 22: A computer program product embodied on a computer-readable storage medium comprising code for performing a method in accordance with any one of Clauses 1-18.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communications by an apparatus, comprising:
   determining that (1) a first scheduled sidelink transmission to a first receiving UE on a first set of component carriers and (2) a second scheduled sidelink transmission to a second receiving UE on a second set of component carriers will overlap in a time domain;
   determining that the first scheduled sidelink transmission has a first transmission time length and the second scheduled sidelink transmission has a second transmission time length, wherein the second transmission time length is shorter than the first transmission time length;

segmenting the first scheduled sidelink transmission into a plurality of first sidelink transmission segments, wherein at least one first sidelink transmission segment of the plurality of first sidelink transmission segments overlaps in the time domain with the second scheduled sidelink transmission; and sending, to the first receiving UE, an indication of the plurality of first sidelink transmission segments.

2. The method of claim 1, wherein indicating the plurality of first sidelink transmission segments to the first receiving UE comprises one or more of:

sending sidelink control information (SCI) via one of a physical sidelink shared channel (PSSCH) or a physical sidelink control channel (PSCCH) that indicates the plurality of first sidelink transmission segments;

sending a medium access control element (MAC-CE) via a PC5 connection that indicates the plurality of first sidelink transmission segments; or sending a radio resource control (RRC) message via the PC5 connection that indicates the plurality of first sidelink transmission segments.

3. The method of claim 1, wherein the indication defines a sequence of redundancy versions associated with the plurality of first sidelink transmission segments.

4. The method of claim 1, wherein at least one first sidelink transmission segment of the plurality of first sidelink transmission segments is configured with a redundancy version different than at least one other first sidelink transmission segment of the plurality of first sidelink transmission segments.

5. The method of claim 1, wherein each first sidelink transmission segment of the plurality of first sidelink transmission segments is configured with a same redundancy version.

6. The method of claim 1, further comprising mapping resource elements associated with each respective first sidelink transmission segment of the plurality of first sidelink transmission segments sequentially in a circular buffer with a starting bit for the respective first sidelink transmission segment based on a redundancy version associated with the respective first sidelink transmission segment.

7. The method of claim 1, wherein:
the first set of component carriers and the second set of component carriers comprise the same component carriers, and
the method further comprises indicating the first scheduled sidelink transmission to the first receiving UE and the second scheduled sidelink transmission to the second receiving UE on any component carrier in the first set of component carriers.

8. The method of claim 1, wherein:
the first set of component carriers and the second set of component carriers comprise different component carriers, and
the method further comprises indicating the first scheduled sidelink transmission to the first receiving UE and the second scheduled sidelink transmission to the second receiving UE on any component carrier in the first set of component carriers.

9. The method of claim 1, wherein the first scheduled sidelink transmission is configured with a lower subcarrier spacing than the second scheduled sidelink transmission.

10. The method of claim 1, wherein:
the first scheduled sidelink transmission comprises a slot-length transmission, and
the second scheduled sidelink transmission comprises a mini-slot-length transmission.

11. The method of claim 1, wherein the first set of component carriers are an intra-band set of component carriers.

12. An apparatus configured for wireless communications, comprising:
one or more memories comprising processor-executable instructions; and
one or more processors configured to execute the processor-executable instructions and cause the apparatus to:
determine that (1) a first scheduled sidelink transmission to a first receiving UE based on a first set of component carriers and (2) a second scheduled sidelink transmission to a second receiving UE on a second set of component carriers will overlap in a time domain;
determine that the first scheduled sidelink transmission has a first transmission time length and the second scheduled sidelink transmission has a second transmission time length, wherein the second transmission time length is shorter than the first transmission time length;
segment the first scheduled sidelink transmission into a plurality of first sidelink transmission segments, wherein at least one first sidelink transmission segment of the plurality of first sidelink transmission segments overlaps in the time domain with the second scheduled sidelink transmission; and
send, to the first receiving UE, an indication of the plurality of first sidelink transmission segments.

13. The apparatus of claim 12, wherein to indicate the plurality of first sidelink transmission segments to the first receiving UE, the one or more processors are configured to execute the processor-executable instructions and cause the apparatus to one or more of:
send sidelink control information (SCI) via one of a physical sidelink shared channel (PSSCH) or a physical sidelink control channel (PSCCH) that indicates the plurality of first sidelink transmission segments;
send a medium access control element (MAC-CE) via a PC5 connection that indicates the plurality of first sidelink transmission segments; or
send a radio resource control (RRC) message via the PC5 connection that indicates the plurality of first sidelink transmission segments.

14. The apparatus of claim 12, wherein the indication defines a sequence of redundancy versions associated with the plurality of first sidelink transmission segments.

15. The apparatus of claim 12, wherein at least one first sidelink transmission segment of the plurality of first sidelink transmission segments is configured with a redundancy version different than at least one other first sidelink transmission segment of the plurality of first sidelink transmission segments.

16. The apparatus of claim 12, wherein each first sidelink transmission segment of the plurality of first sidelink transmission segments is configured with a same redundancy version.

17. The apparatus of claim 12, wherein the one or more processors are configured to execute the processor-executable instructions and cause the apparatus to map resource elements associated with each respective first sidelink transmission segment of the plurality of first sidelink transmission segments sequentially in a circular buffer with a starting bit for the respective first sidelink transmission segment based on a redundancy version associated with the respective first sidelink transmission segment.

18. The apparatus of claim 12, wherein:
the first set of component carriers and the second set of component carriers comprise the same component carriers, and
the one or more processors are configured to execute the processor-executable instructions and cause the apparatus to indicate the first scheduled sidelink transmission to the first receiving UE and the second scheduled sidelink transmission to the second receiving UE based on any component carrier in the first set of component carriers.

19. The apparatus of claim 12, wherein:
the first set of component carriers and the second set of component carriers comprise different component carriers, and
the one or more processors are configured to execute the processor-executable instructions and cause the apparatus to indicate the first scheduled sidelink transmission to the first receiving UE and the second scheduled sidelink transmission to the second receiving UE based on any component carrier in the first set of component carriers.

20. The apparatus of claim 12, wherein the first scheduled sidelink transmission is configured with a lower subcarrier spacing than the second scheduled sidelink transmission.

\* \* \* \* \*